(12) United States Patent
Hopkins

(10) Patent No.: US 7,089,447 B2
(45) Date of Patent: Aug. 8, 2006

(54) APPARATUS AND METHOD FOR COMPRESSION BASED ERROR CORRECTION PROCEDURE IN A DATA PROCESSING SYSTEM

(75) Inventor: Harland Glenn Hopkins, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 163 days.

(21) Appl. No.: 10/640,162

(22) Filed: Aug. 13, 2003

(65) Prior Publication Data

US 2005/0039072 A1 Feb. 17, 2005

(51) Int. Cl.
G06F 12/00 (2006.01)

(52) U.S. Cl. .................. 714/6; 714/710; 711/102; 711/103; 711/162

(58) Field of Classification Search .............. 714/6, 714/710; 711/102, 103, 162
See application file for complete search history.

(56) References Cited

U.S. PATENT DOCUMENTS

| | | | | |
|---|---|---|---|---|
| 5,432,802 A | * | 7/1995 | Tsuboi | 714/710 |
| 5,787,241 A | * | 7/1998 | Henry et al. | 714/2 |
| 2004/0230879 A1 | * | 11/2004 | Crosby | 714/718 |

FOREIGN PATENT DOCUMENTS

| | | | |
|---|---|---|---|
| JP | 06052064 A | * | 2/1994 |
| JP | 06119255 A | * | 4/1994 |
| JP | 06303149 A | * | 10/1994 |
| JP | 09311825 A | * | 12/1997 |

* cited by examiner

Primary Examiner—Hong Kim
(74) Attorney, Agent, or Firm—William W. Holloway; W. James Brady; Frederick J. Telecky, Jr.

(57) ABSTRACT

In a data processing system in which the complete set of op-code signal groups are stored in a ROM unit, a programmable, non-volatile memory unit stores the address signal groups of the set of op-code signal groups currently controlling the operation of the data processing system. In addition, the programmable, non-volatile memory unit has error checking and correction signal groups associated with each op-code signal groups. To retrieve an op-code signal group from the ROM unit, the central processing unit applies a pointer/address signal group to the programmable, non-volatile memory. The op-code address and the error checking and correction signal group at the location specified by the pointer/address signal group is retrieved from the programmable, non-volatile memory unit, subjected to error checking and correction procedures and the resulting address signal groups is applied to the ROM unit. The op-code signal group identified by the address signal group is retrieved and transferred to the central processing unit. A net data compression is achieved by this configuration.

15 Claims, 3 Drawing Sheets

APPARATUS AND METHOD FOR COMPRESSION BASED ERROR CORRECTION PROCEDURE IN A DATA PROCESSING SYSTEM

BACKGROUND OF THE INVENTION

1. Field of the Invention

This invention relates generally to the storage and retrieval of op-code signal groups in a data processing unit and, more particularly, to the storage and retrieval of op-code signal groups having error checking and correction signal groups associated therewith.

2. Background of the Invention

Referring to FIG. 1, the technique for the storage and retrieval of op-code signal groups in a data processing system 10, according to the prior art, is illustrated. A central processing unit 11 stores op-code signal groups in read-only-memory (ROM) unit 12. In addition to the op-code signal groups stored in the ROM unit 12, error checking a correct signal groups for each op-code signal group are stored in the ROM unit 12. All of the op-code signal groups are stored in the ROM unit 12 even though each set of op-code signal groups used to control the operation of a data processing unit may not include all combinations of op-code signal groups. The op-code signal groups and error checking and correction signal groups are stored in the ROM unit 12 at the time of fabrication. During operation of the central processing unit, when an op-code signal group is required, and the central processing unit 11 requires a particular signal group, the central processing unit 11 sends the address of the required op-code signal group to the memory unit 12. The memory unit 12, in response to address signal group, retrieves the op-code signal group identified by the address signal group. The retrieved op-code signal group is applied to the error checking and correction code unit 13. The error checking and correction unit 13 examines the op-code signal group and the associated error checking and correcting signal group. Based on this examination and depending upon the error checking and correcting procedure implemented by the data processing system 10, a single error in the retrieved signal groups can be corrected and a double error can be identified. When correction is possible, the error is corrected by the error checking and correction unit 13 and the corrected op-code signal group is transferred to the central processing unit 11.

For example, each set of op-code signal groups can be, in current data processing implementations, over 32,000 32-bit words. The number of used 32-bit words can be over 22,000 32-bit words and the number of unique op-code words can be over 17,000. When the error checking and correction signal groups are added, the memory requirements can be large. In addition, the use of the ROM unit to store the complete set of op-code words is relatively inflexible.

A need has therefore been felt for apparatus and an associated method having the feature that the storage and retrieval requirements for op-code signal groups can be more flexible while retaining the use of error checking and correction techniques in a data processing system. It would be another feature of the apparatus and associated method to provide a programmable non-volatile storage unit for storing the group of addresses in the ROM unit of the op-code signal groups that are currently being utilized by the data processing system. It would be a still further feature of the apparatus and associated method to provide error checking and correction procedures to the op-code signal address signal groups stored in the programmable, non-volatile memory. It would be a more particular feature of the apparatus and associated method to implement the programmable, non-volatile memory in FLASH technology. It would be a still further feature of the apparatus and related method to provide for a reduced signal group storage requirement.

SUMMARY OF THE INVENTION

The aforementioned and other features can be accomplished, according to the present invention, by providing a ROM unit in which the entire set of op-code instructions and providing a programmable, non-volatile memory unit storing the addresses of the group of op-code signal groups currently controlling the operation of the data processing system. The address signal groups stored in the programmable, non-volatile memory have error checking and correction bits stored therewith. Because the address signal groups have a smaller number of bits, the address signal groups and associated error checking and correction signal groups have a smaller number of bits than the associated op-code signal groups along with the associated address signal groups. This lower number of data bits results in a data compression of the stored data. To retrieve an op-code signal group from the ROM unit the central processing unit applies a pointer/address signal group to the programmable, non-volatile memory. The op-code address and the error checking and correction signal group at the location specified by the pointer/address signal group is retrieved from the programmable, non-volatile memory unit, subjected to error checking and correction procedures and the resulting address signal groups is applied to the ROM unit. The op-code signal group identified by the address signal group is retrieved and transferred to the central processing unit.

Other features and advantages of present invention will be more clearly understood upon reading of the following description and the accompanying drawings and the claims.

DESCRIPTION OF THE PREFERRED EMBODIMENT

1. Detailed Description of the Figures

Figure 1:
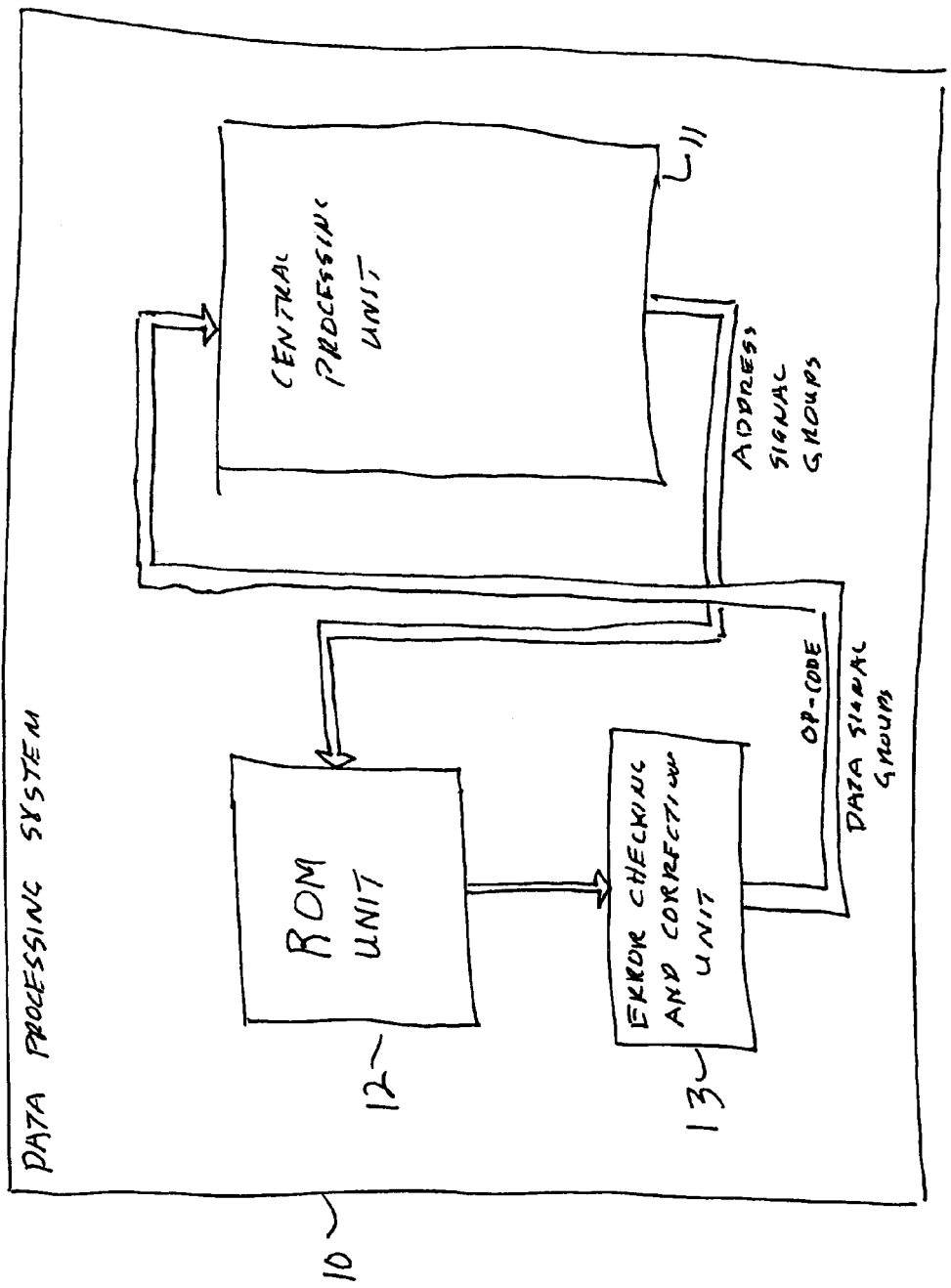
FIG. 1 illustrates the apparatus for the storage and retrieval of instruction groups in a data processing system according to the prior art.

FIG. 1 has been described with respect to the related art.

Figure 2:
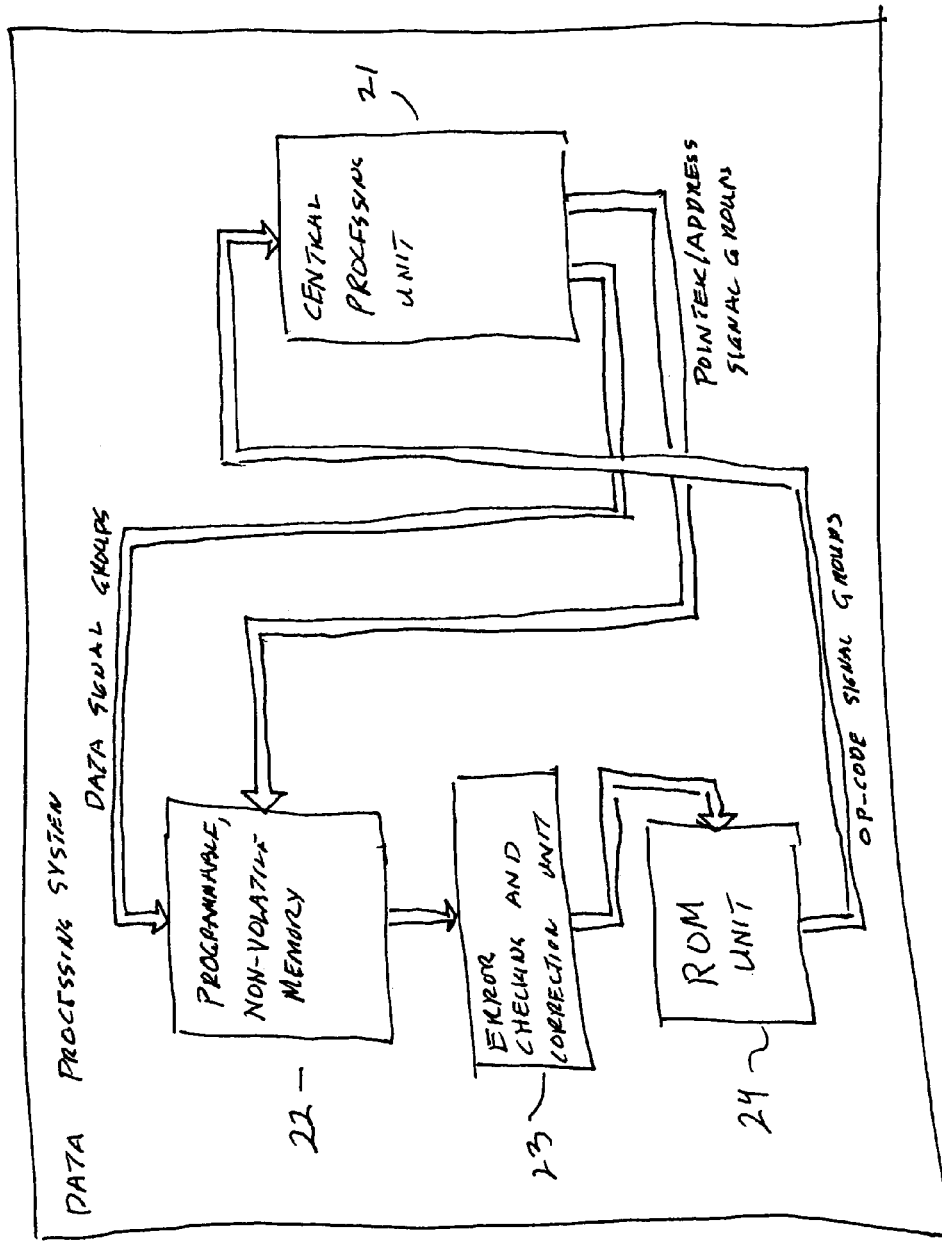
FIG. 2 illustrates the apparatus for storage and retrieval of instruction signal groups according to the prior art.

Referring next to FIG. 2, a data processing system 20 for the storage and retrieval of signal groups according to the present invention is shown. The data processing system 20 includes a central processing unit 21 that requires a sub-set of signal groups stored memory unit 24. For each signal group of the sub-set required by the central processing unit 21, the central processing unit identifies this signal group by an address of the compressed file memory unit 22. The central processing unit 21 stores at each address of the compressed file memory unit 22 the address of the required data signal group in memory unit 24 in a compressed format, i.e., a pointer to the location of the required signal group in the memory unit 24, along with error checking and correction signal groups. The data processing unit 21, in order to retrieve a required signal group, applies to the compressed file memory unit 22 the address of the pointer to the location of the required data signal group in the memory unit 24. The compressed file memory unit 22, in response to the applied address, retrieves the compressed signal group, i.e., pointer, from the addressed location and the associated error checking and correction signal group associated therewith and applies the addressed compressed signal group and associated error checking and correction signal group to the error checking and correction unit 23. In the error checking and correction unit, a determination is made whether an error is present in the pointer signal group and, if the error is correctable, the error access is corrected. The pointer/compressed signal group is then applied to the memory unit 24. The required signal group, stored in the location designated by the pointer/compressed signal group is retrieved and applied to the central processing unit 21.

Figure 3:
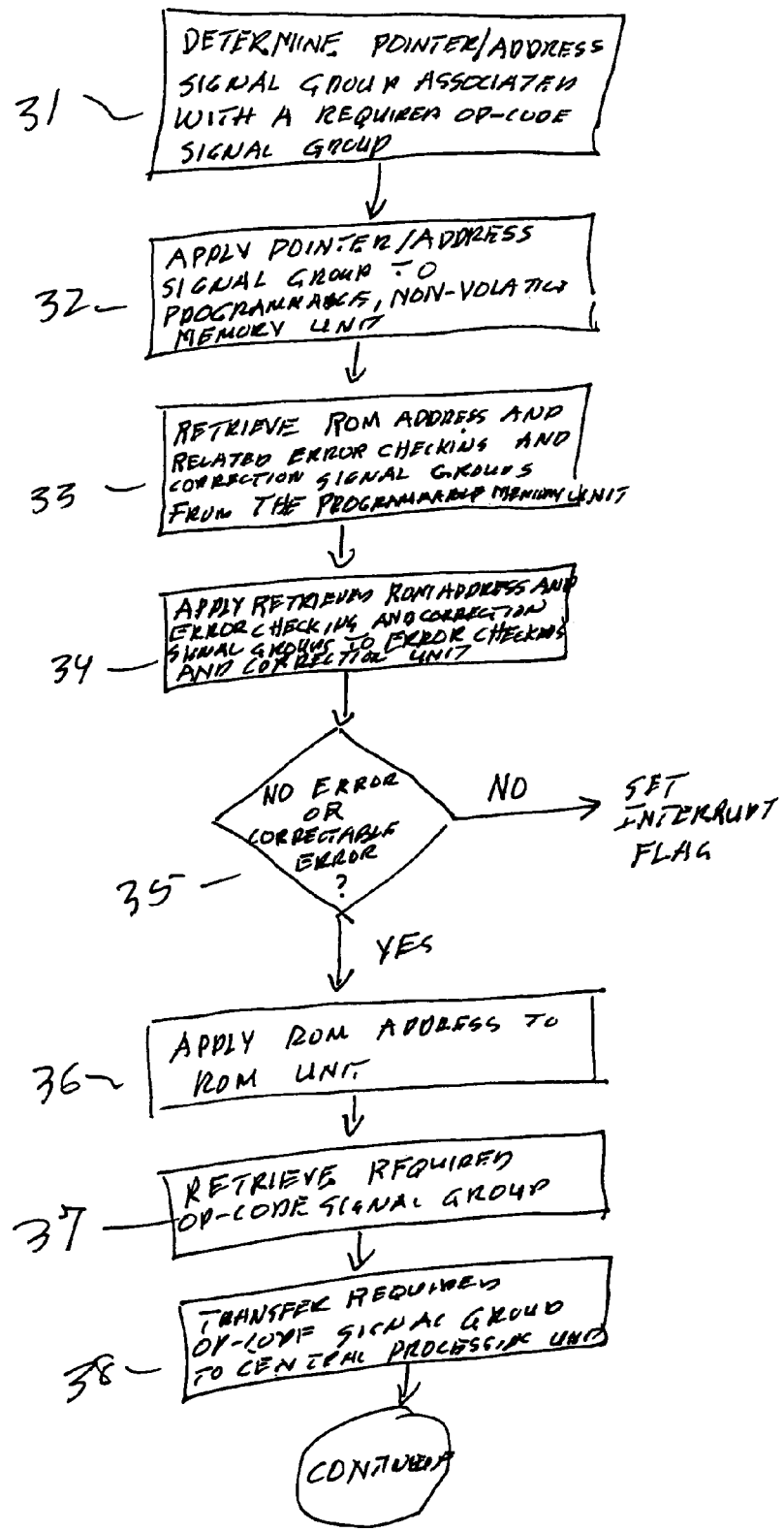
FIG. 3 is a flow chart illustrating the operation of the present invention.

Referring to FIG. 3, the process for retrieving an op-code signal group, according to the present invention is shown. In step 33, the central processing unit determines the required op-code signal group that is to be retrieved. The central processing unit then determines the point/address signal group associated with the required op-code signal group. The central processing unit then applies the pointer/address signal group to the programmable, non-volatile memory unit in step 32. In step 33, a ROM address and an associated error checking and correction signal group is retrieved from the programmable, non-volatile memory unit. The retrieved signal groups are applied to the error checking and correction unit in step 34. In step 35, a determination is made whether the ROM address has no error or has a correctable error. When the determination in step 35 is negative, an interrupt flag is set to alert the central processing unit that an uncorrectable error has been identified. When the determination in step 35 is positive, the correct ROM address is applied to the ROM unit in step 36. In step 37, the op-code signal group is retrieved from the ROM unit. And in step 38, the retrieved op-code signal group is transferred to the central processing unit. The transferred op-code signal is the op-code signal group required by the central processing unit.

2. Operation of the Preferred Embodiment

The invention can be understood as follows. In the processing environment, sub-sets of op-code signal groups can be used to control the operation of the central processing unit rather than a full set of op-code signal groups. In the preferred embodiment, the sub-set of op-code signal groups used by the central processing unit are stored in the programmable, non-volatile memory unit. The entire set of op-code signal groups is stored in the ROM unit. For a program using a sub-set of the instructions, the central processing unit can use a pointer/address signal groups that identifies a ROM address in the programmable, non-volatile memory unit. The ROM address is retrieved from the programmable, non-volatile memory and applied to an error checking and correction unit. In the preferred embodiment, the programmable, non-volatile memory unit is implemented using a FLASH-technology memory unit. The FLASH memory unit is more likely to generate an error than ROM unit. Therefore, the error checking and correction procedures are more effectively applied to the output of the FLASH memory unit rather than the ROM unit.

The use of error checking and correction techniques in only the programmable, non-volatile memory unit has the advantage that the number of bits forming the pointer/address signal group is (typically much) smaller than the number of bits forming the op-code signal groups in the ROM unit. Because the number of error checking and correction signal groups associated with each data signal group is a function of the number of bits forming the instruction, the total memory required can be reduced when error checking and correction signal groups are associated with a reduced bit signal group. In addition, the programmable, non-volatile memory unit includes only op-code signal groups that are currently being used by the central processing unit rather than the entire set of op-code signal groups stored in the ROM unit. The use of the programmable, non-volatile memory unit permits the sub-set of the set of op-code signal groups stored therein to be altered resulting in a greater flexibility in the operation of the data processing system.

By way of specific example, the op-code signal groups of the preferred embodiment are 32-bits in length. In addresses of the ROM op-code signal groups stored in the programmable non-volatile memory unit are 15-bits in length. The associated error checking and correction signal groups are therefore corresponding shorter for the ROM addresses than would the error checking and correction for the ROM address signal groups stored in the programmable non-volatile memory unit. The result is a net reduction in the storage requirements for providing the op-code signal groups.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A data processing system comprising:
    a central processing unit;
    a ROM unit storing op-code signal groups;
    a programmable, non-volatile memory unit storing ROM pointer/address signal groups for a sub-set of op-code signal groups stored in the ROM unit, the programmable memory unit storing associated error checking and correction signal groups with each ROM pointer/address signal group; and
    an error checking and correction unit, wherein application of a pointer/address signal group to the programmable memory unit transfers a retrieved ROM unit pointer/address signal group and an associated error checking and correction signal group to the error checking and correction unit, the error checking and correction unit applying the retrieved first memory address signal group to the ROM unit, the ROM unit transferring the op-code signal group at the ROM unit address identified by the pointer/address signal group to the central processing unit.

2. The data processing system as recited in claim 1 wherein the memory space for the pointer/address signal group, along with the associated error checking and correction bits and the op-code signal groups is less than the memory space for the op-code signal groups and associated error checking and correction bits.

3. The data processing system as recited in claim 1 wherein the ROM memory unit stores a set of all possible op-codes signal groups for the central processing unit.

4. The data processing system as recited in claim 1 wherein the central processing unit applies a pointer/address signal group to the programmable memory unit to retrieve a ROM address.

5. The data processing system as recited in claim 1 wherein the programmable memory unit is implemented in FLASH technology.

6. The data processing system as recited in claim 1 wherein an interrupt flag is generated when the error checking and correction unit identifies an uncorrectable error.

7. A method for the retrieval of a selected op-code signal groups, the method comprising:
   applying an address signal group to a programmable, non-volatile memory unit, the addressed location including a ROM address signal group and an error checking and correction signal group;
   implementing an error checking and correction procedure for the ROM address signal group and the error checking and correction signal groups;
   applying the ROM address signal group to a ROM unit; and
   transferring the op-code signal group stored at the ROM address signal group location to the central processing unit, the op-code signal groups being the selected op-code signal group.

8. The method as recited in claim 7 wherein the ROM address signal groups along with associated the error checking and correction signal groups and the op-code signal groups require less memory space than the op-code signal groups along with associated error checking and correction signal groups.

9. The method as recited in claim 8 further including implementing the programmable memory unit in FLASH technology.

10. The method as recited in claim 8 wherein the ROM unit stores the entire set of op-codes signal groups for a central processing unit.

11. The method as recited in claim 10 wherein the programmable, non-volatile memory stores a sub-set of the op-codes signal groups stored in the ROM unit, the sub-set of op-code signal groups being used for the current operation of the central processing unit.

12. A data processing system comprising:
   a central processing unit, the central processing unit controlled by a current set of op-code signal groups;
   a ROM memory unit storing all op-code signal groups for the central processing unit, each op-code signal group identified by an op-code address;
   a programmable, non-volatile memory unit having locations storing the ROM addresses for the current op-code signal groups, each location also storing an associated error checking and correction signal group for the ROM address signal group at that location; and
   an error checking and correction unit coupled to the programmable, non-volatile memory unit, the error checking and correction unit applying error checking and correction techniques to the signal groups retrieved from the programmable, non-volatile memory unit, the error checking and correction unit applying the ROM address to the ROM unit;
   wherein the central processing unit applies a pointer/address signal group to the programmable, non-volatile memory unit when an op-code signal group is required, the pointer/address signal group identifying a location storing the ROM address of the required op-code signal group.

13. The data processing system as recited in claim 12 wherein the programmable, non-volatile memory unit is implemented in FLASH technology.

14. The data processing system as recited in claim 12 wherein an interrupt signal is generated when a non-correctable error is identified by error checking and correction unit.

15. The data processing system as recited in claim 12 wherein the ROM addresses along with associated error checking and correction signal groups and op-code signal groups require less memory space than the op-code-signal groups along with associated error checking and correction signal groups.

* * * * *